Figure 4:
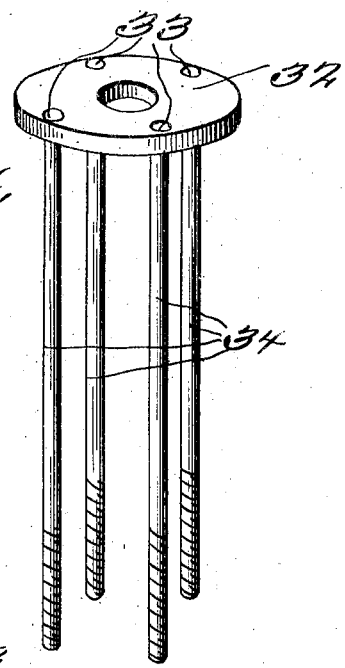

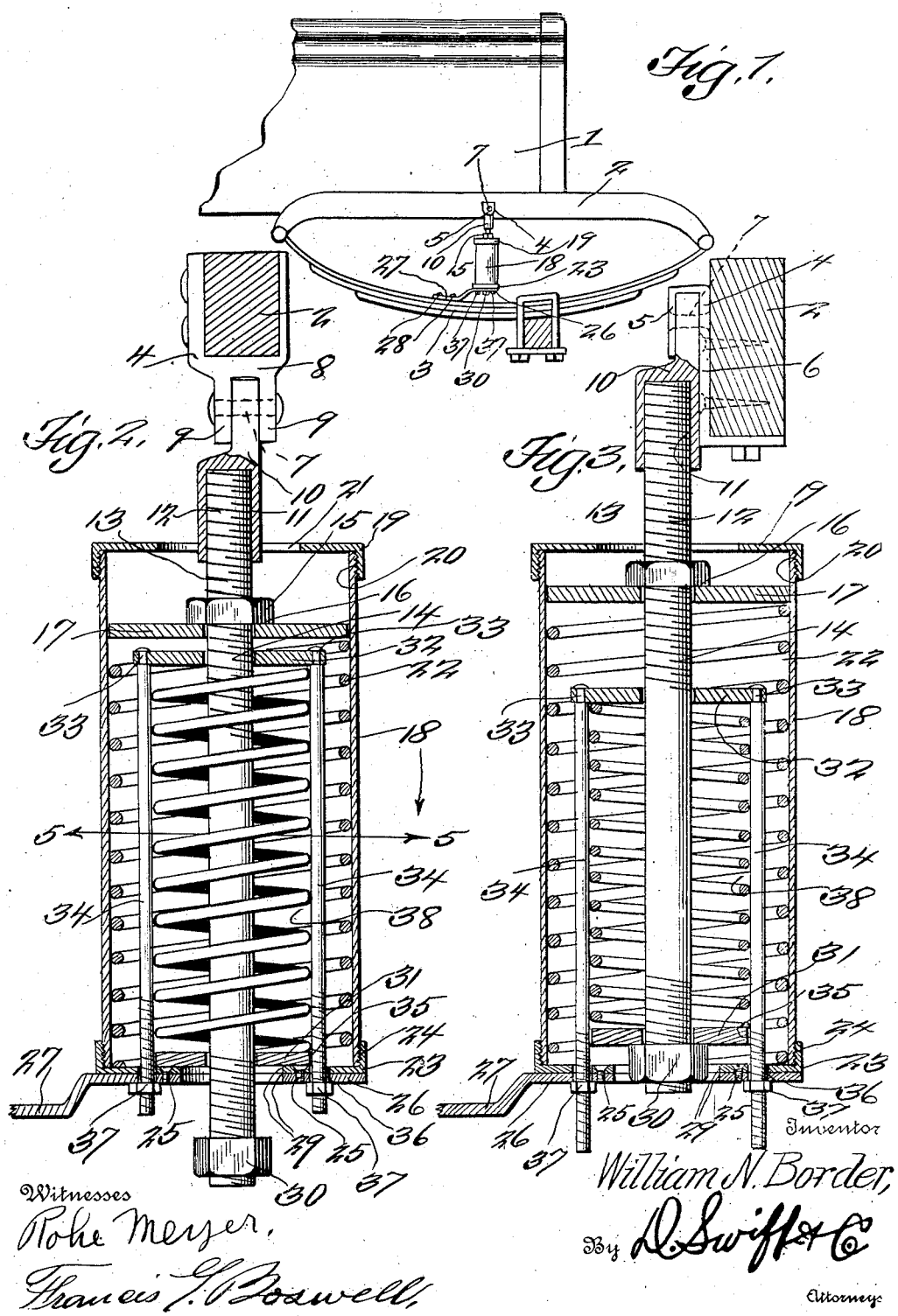

W. N. BORDER.
SHOCK ABSORBER.
APPLICATION FILED JUNE 25, 1912.

1,044,339.

Patented Nov. 12, 1912.

2 SHEETS—SHEET 2.

Witnesses
Rolie Meyer.
Francis T. Boxwell.

Inventor
William N. Border,
By D. Swift & Co.
Attorneys

UNITED STATES PATENT OFFICE.

WILLIAM N. BORDER, OF DUNLAP, MISSOURI.

SHOCK-ABSORBER.

1,044,339.  Specification of Letters Patent.  Patented Nov. 12, 1912.

Application filed June 25, 1912. Serial No. 705,752.

*To all whom it may concern:*

Be it known that I, WILLIAM N. BORDER, a citizen of the United States, residing at Dunlap, in the county of Grundy and State of Missouri, have invented a new and useful Shock-Absorber; and I do hereby declare the following to be a full, clear, and exact description of the invention, such as will enable others skilled in the art to which it appertains to make and use the same.

This invention relates to a new and useful shock absorber.

As one of the objects of the invention, it is the aim, to provide a simple, efficient and practical device of this nature, which will absorb the vibrations and strains of the body of a vehicle, in order to permit the occupants thereof to ride with ease and comfort.

A further object of the invention is to provide a compound or double spring arrangement, so arranged as to insure the absorption of all the vibrations, shocks and strains of the body of the vehicle.

A further object of the invention is the inclusion of means in combination with the compound or double spring arrangement, whereby the tension of the springs may be regulated, for doubly insuring the absorbing of the shocks and vibrations of the vehicle body, particularly in case of extra weight thereon.

The invention comprises further features and combination of parts, as hereinafter set forth, shown in the drawings and claimed.

Figure 5:
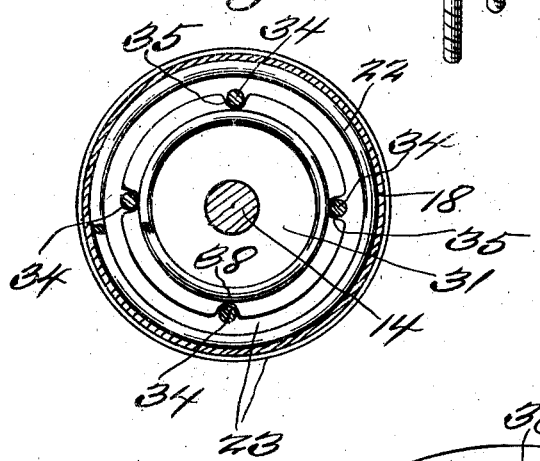
Figure 6:
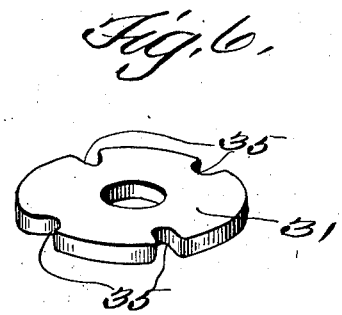
Figure 7:
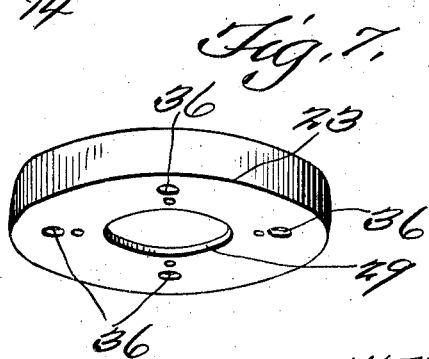

In the drawings:—Figure 1 is a view in elevation, showing a portion of an automobile equipped with the improved shock absorber. Fig. 2 is a sectional view through the shock absorber. Fig. 3 is a similar view showing certain parts adjusted, in order to increase the tension of the springs. Fig. 4 is a detail view of an inner spring tensioned member, showing four rods thereof. Fig. 5 is a sectional view on line 5—5 of Fig. 2. Figs. 6 and 7 are detail views.

Referring more particularly to the drawings 1 designates a portion of an automobile, while 2 denotes the sill of the vehicle, whereas 3 marks the vehicle spring. Connected to the sill 2 is a bracket 4, which may be of any desired or necessary construction, suitable for application to any style vehicle or automobile. In the present instance, in Figs. 1 and 3 this bracket is constructed with an overhanging portion 5, between which and the upright portion 6, a pin 7 is arranged.

In Fig. 2, however, the bracket 4 is provided with an offset portion 8, which engages under the sill 2, and is provided with two ears 9, in which the pin 7 is mounted.

Pivotally mounted upon the pin 7 is a coupling member 10, having interior threads 11, to engage the threads 12 of the extension 13 of the rod 14. Immediately below the threads 12 is a threaded collar 15, thereby forming a shoulder 16, which contacts with the annular plate 17. This annular plate 17 fits within a tubular shell or cylinder 18. To hold the annular plate 17 in place, a cap 19 is threaded at 20 to the cylinder or shell 18. This cap 19 is provided with an opening 21, of sufficient diameter to permit the threaded collar to pass therethrough, in order to bear against the annular plate 17, which in turn acts against the coil spring 22, which is arranged upon the interior of the cylinder 18 as shown. The lower portion of the spring 22 seats upon the cap 23 (which is threaded at 24 to the lower end of the cylinder).

Riveted or otherwise secured at 25 to the cap is a plate 26 having an offset portion 27, which is secured at 28 to the spring 3. This plate 26 may be any desired or necessary construction. The plate 26 and cap 23 are provided with registering openings 29 of diameters sufficient to permit the nut 30 to pass freely therethrough, as the rod 14 is depressed, incident to the shocks and jars. The nut 30 is threaded to the rod 14, and contacts with the annular plate 31, through which the rod 14 moves. A plate 32 similar to the plate 31 is provided and arranged on the interior of the coil spring 22. The rod 14 also passes through the plate 32.

Fixed at 33 to the plate 32 are four rods 34, which pass through openings 35 of the plate 31, and through openings 36 of the cap 23 and the plate 26, and upon th lower ends of the rods 34 nuts 37 are threaded. Arranged between the plates 31 and 32 is a coil spring 38, and it will be noted that by adjusting the nuts 37 the tension of the spring 38 may be increased or decreased, and by adjusting the collar 15, the tension of the spring 22 may be increased or decreased.

When an automobile is equipped with this improved shock absorber, and the body of the automobile vibrates downwardly, incident to passing an obstruction or an unevenness, both springs will substantially support the pressure and absorb such vibrations, and upon the re-bounding vibration, the nut 30 will contact with the plate 31, so that the spring 38 will absorb the latter or rebounding vibration.

In the drawings certain features are disclosed, but in practical fields these features may necessitate alterations, to which the patentee is entitled, provided the alterations are comprehended within the scope of what is claimed.

From the foregoing it will be noted that there has been produced a novel, simple, efficient and desirable shock absorber, for automobiles and the like, and one in which tension of the compound or double spring arrangement may be adjusted, and which feature and others above named have been found practical.

The invention having been set forth, what is claimed as new and useful is:—

In combination with an automobile having a sill and provided with a spring, a rod suspending from the sill having an adjustable collar adjacent the sill, a cylinder through which the rod extends, means for fastening the cylinder to the springs, an annular plate in the upper end of the cylinder and with which the adjustable collar contacts, a coil spring disposed between the plate and the bottom of the cylinder, a second plate arranged within the cylinder and within the coil spring and adjacent the bottom of the cylinder, a third plate arranged adjacent the first plate but spaced a short distance therefrom and within the coil spring, a plurality of rods carried by the third plate and passing through the second plate and the bottom of the cylinder, a coil spring interposed between the second and third plates, means on the plurality of rods whereby the tension of the second coil spring may be increased or decreased, while the adjustable collar constitutes means for adjusting the first coil spring, and means on the lower end of the first rod to contact with the second plate.

In testimony whereof I have signed my name to this specification in the presence of two subscribing witnesses.

WILLIAM N. BORDER.

Witnesses:
W. H. FUNK,
J. R. WINFREY.